United States Patent
Tu et al.

(10) Patent No.: US 12,499,656 B2
(45) Date of Patent: Dec. 16, 2025

(54) METHOD, THE DEVICE, AND THE COMPUTER-READABLE RECORDING MEDIUM FOR DIAGNOSING THE REASON OF THE MALFUNCTION

(71) Applicant: ADLINK TECHNOLOGY INC., Taoyuan (TW)

(72) Inventors: Wei-Jyun Tu, Taoyuan (TW); Yu-Yen Chen, Taoyuan (TW); Chien-Chung Lin, Taoyuan (TW)

(73) Assignee: ADLINK TECHNOLOGY INC., Taoyuan (TW)

( * ) Notice: Subject to any disclaimer, the term of this patent is extended or adjusted under 35 U.S.C. 154(b) by 339 days.

(21) Appl. No.: 18/482,030

(22) Filed: Oct. 6, 2023

(65) Prior Publication Data
US 2025/0037425 A1 Jan. 30, 2025

(30) Foreign Application Priority Data
Jul. 27, 2023 (TW) .................. 112128082

(51) Int. Cl.
*G06V 10/764* (2022.01)
*G06T 5/10* (2006.01)

(52) U.S. Cl.
CPC .............. *G06V 10/764* (2022.01); *G06T 5/10* (2013.01); *G06T 2207/20084* (2013.01)

(58) Field of Classification Search
CPC .... G06V 10/764; G06V 10/82; G06V 10/431; G06V 10/803; G06T 5/10; G06T 2207/20084; G06T 7/0004; G06T 2207/20081; G06T 2207/20064; G06T 2207/20216; G06T 2207/20221; G06T 2207/30164; G06F 18/24; G06F 18/15; G06F 2218/02; G06F 2218/12; G06N 3/0464; G06N 3/08; G06N 3/045; G06N 3/09; G06N 3/04; G06N 3/0455; G06N 3/047; G06N 3/088; G06N 3/0895; G01R 31/62

See application file for complete search history.

(56) References Cited

U.S. PATENT DOCUMENTS 10,839,253 B2 * 11/2020 Balan .................. G06F 18/21
11,619,682 B2 *  4/2023 He .................. G06N 3/0464
                                                                  702/59

(Continued)

OTHER PUBLICATIONS

Norden Huang et al., The empirical mode decomposition and the Hilbert spectrum for nonlinear and non-stationary time series analysis, Mar. 6, 2023, HAL-04014501.

*Primary Examiner* — Michael S Osinski

(57) ABSTRACT

A method for diagnosing a reason of a malfunction is provided. The method includes: receiving a signal to be diagnosed; decomposing the signal to be diagnosed into a plurality of sub-signals; transforming each of the plurality of sub-signals into a corresponding grayscale image; and inputting the corresponding grayscale images to a neural network model, and outputting a malfunction reason classification result through the neural network model. Accordingly, the method can be used for diagnosing the reason of the malfunction and solves the problem of incapable of diagnosing the reason of the malfunction. In addition, a device and a computer-readable recording medium for diagnosing the reason of the malfunction are also provided.

20 Claims, 6 Drawing Sheets

(56) References Cited

U.S. PATENT DOCUMENTS

| | | | |
|---|---|---|---|
| 11,875,500 B2 * | 1/2024 | He | G06N 3/045 |
| 12,313,497 B2 * | 5/2025 | Bao | G06F 18/253 |
| 2019/0204820 A1 * | 7/2019 | Andrassy | G06N 5/022 |
| 2020/0057939 A1 * | 2/2020 | Ohashi | G06N 3/045 |
| 2020/0134809 A1 * | 4/2020 | Moioli | G06T 7/0004 |
| 2021/0382120 A1 * | 12/2021 | He | G06F 18/217 |
| 2023/0205161 A1 * | 6/2023 | Klos | G06N 3/088 |
| | | | 700/9 |
| 2023/0410572 A1 * | 12/2023 | Gong | G06V 10/82 |
| 2024/0142342 A1 * | 5/2024 | Bao | G01M 13/045 |

* cited by examiner

METHOD, THE DEVICE, AND THE COMPUTER-READABLE RECORDING MEDIUM FOR DIAGNOSING THE REASON OF THE MALFUNCTION

CROSS-REFERENCE TO RELATED APPLICATION

This non-provisional application claims priority under 35 U.S.C. § 119 (a) on Patent Application No(s). 112128082 filed in Taiwan, R.O.C. on Jul. 27, 2023, the entire contents of which are hereby incorporated by reference.

BACKGROUND OF THE INVENTION

1. Field of the Invention

The present disclosure provides a diagnostic method and device, and a computer-readable recording medium, and in particular to a method, a device and a computer-readable recording medium for diagnosing a reason of a malfunction.

2. Description of the Related Art

With the boom of Industry 4.0, many factories are constantly providing automated apparatuses to increase the capacity of the plant, and these apparatuses are mostly scheduled to operate 24 hours a day, so it is important to predict the maintenance needs of these apparatuses. Through the capture and analysis of some signals, if the maintenance time of these apparatuses can be predicted, or different problems of these apparatuses can be found, it will greatly increase the user's control over these apparatuses and help the maintenance of production capacity.

Generally speaking, the malfunction analysis of these apparatuses can usually be divided into manual analysis and automatic identification, but because the manual analysis needs to heavily rely on the practical judgment experience of the judge, and it is difficult for the judge to pass on the practical judgment experience to others. Therefore, in terms of future trends, the malfunction analysis of these apparatuses is bound to tend to use artificial intelligence to replace manual analysis.

Regarding the collection of signals to make prediction judgment of these apparatuses, the existing technology can only predict that these apparatuses are about to fail, but it is still unable to effectively distinguish which type of malfunction of these apparatuses is about to occur, so it will not be able to effectively find out the appropriate maintenance method (i.e., it cannot effectively carry out preventive maintenance for the problem that is about to occur). That is, the existing technology can only predict that these apparatuses are about to fail, and then replace the motor or carry out other basic maintenance for the apparatus that is about to fail.

BRIEF SUMMARY OF THE INVENTION

Based on the foregoing, the purpose of the present disclosure is to solve the deficiencies of prior art. Specifically, the purpose of the present disclosure is to solve the problem that the reason of the malfunction cannot be predicted.

The present disclosure provides a method for diagnosing a reason of a malfunction, including: receiving a signal to be diagnosed; decomposing the signal to be diagnosed into a plurality of sub-signals; transforming each of the plurality of sub-signals into a corresponding grayscale image; and inputting the corresponding grayscale images to a neural network model, and outputting a malfunction reason classification result through the neural network model.

In some embodiments, the method for diagnosing the reason of the malfunction provided by the present disclosure further includes: comparing the number of the plurality of sub-signals with a predetermined number of grayscale figures that the neural network model can receive; when the number of the plurality of sub-signals is greater than or equal to the predetermined number of grayscale figures, the decomposition of the signal to be diagnosed is stopped; and when the number of the plurality of sub-signals is less than the predetermined number of grayscale figures, at least one infilling image is provided to the neural network model.

Further, the present disclosure also provides a device for diagnosing a reason of a malfunction, suitable for connecting with an apparatus to be diagnosed by signal, in order to receive a signal to be diagnosed from the apparatus to be diagnosed, the device including: a signal receiving unit, suitable for receiving the signal to be diagnosed; a processing unit, configured to couple with the signal receiving unit; and a storage unit, configured to couple with the processing unit. Among them, the storage unit stores a code, and after executing the code stored in the storage unit, the processing unit can complete the method for diagnosing the reason of the malfunction as described above.

Further, the present disclosure also provides a computer-readable recording medium capable of diagnosing a reason of a malfunction, after a computer loads and executes a code stored in the computer-readable recording medium, the computer-readable recording medium can complete the method for diagnosing the reason of the malfunction as described above.

The technical means provided by the present disclosure may produce beneficial effects that cannot be achieved by prior art. Specifically, the beneficial effect of the present disclosure is to predict the reason of the malfunction, for the user to be able to carry out a corresponding maintenance treatment for each reason of the malfunction that is predicted.

DETAILED DESCRIPTION OF THE INVENTION

Figure 1:
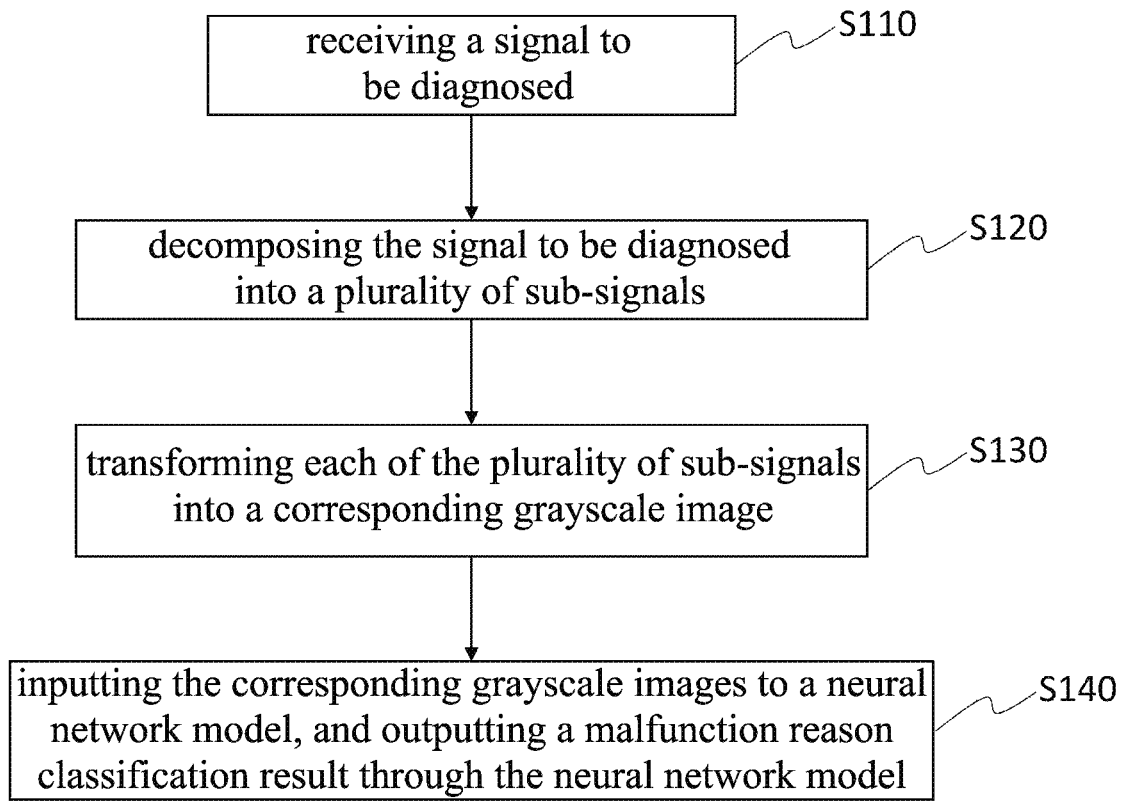
FIG. 1 is a flowchart illustrating a method for diagnosing a reason of a malfunction of an embodiment of the present disclosure.

The present disclosure will be described in detail by the following embodiments and the accompanying drawings, so as to assist a person having ordinary knowledge in the art to understand the object, features and effects of the present disclosure. It should be noted that the steps described herein may be performed sequentially, in reverse order, or by appropriately changing or skipping the order during the control process.

Before the present disclosure is described in detail, it should be noted that the same element or step may be indicated by the same reference numeral in the following description.

Referring to FIG. 1, FIG. 1 is a flowchart illustrating a method for diagnosing a reason of a malfunction of an embodiment of the present disclosure, the method includes steps S110, S120, S130 and S140.

In step S110, a signal to be diagnosed is received. The signal to be diagnosed refers to a signal generated by an apparatus to be diagnosed, that is, step S110 may be performed by connecting a signal line known to a person having ordinary knowledge in the art with the apparatus to be diagnosed by signal to receive the signal to be diagnosed.

In step S120, the signal to be diagnosed is decomposed into a plurality of sub-signals, which can be decomposed by methods such as wavelet transformation, steady-state wavelet transformation or empirical mode decomposition (EMD).

Since EMD can be used to process various types of signals, including nonlinear signals and unsteady state signals, such as stock market indices, electrocardiograms, voice signals, or vibration signals. Furthermore, EMD does not require any assumptions or priori knowledge of the signal, so that EMD will not distort the analysis results caused by inaccurate assumptions. In addition, EMD can preferably capture the detailed information in the signal by decomposing the signal into a plurality of local components, so that EMD can be more effective in extracting the local features of the signal. Thus, in some embodiments, the signal to be diagnosed may be decomposed into a plurality of sub-signals by an empirical mode decomposition model, so that various complex signals can be decomposed into a limited number of intrinsic mode function (IMF).

In some embodiments, the decomposition process regarding the signal to be diagnosed decomposing into a plurality of sub-signals by an empirical mode decomposition model may include the following steps:

The first step is to find an upper envelope u(t) and a lower envelope l(t) from an input signal S(t). That is, the first step will find all the points of the local maximum and the points of the local minimum from the signal S(t) to be diagnosed, and use the cubic spline interpolation function to respectively fit and form the upper envelope u(t) and the lower envelope l(t) of the signal S(t) to be diagnosed.

The second step is to calculate an average line m(t) of the upper envelope u(t) and the lower envelope l(t), and calculate the difference between the input signal S(t) and the average line m(t) to obtain a new signal h(t). That is, the second step will calculate the average line m(t) of the upper envelope u(t) and the lower envelope l(t) of the signal S(t) to be diagnosed, and calculate the difference between the signal S(t) to be diagnosed and the average line m(t) to obtain a difference line h(t).

The third step is to verify the new signal h(t) by the condition of intrinsic mode function, where the condition of intrinsic mode function may be:

$$SD_k = \frac{\sum_{t=0}^{T} |h_{k-1}(t) - h_k(t)|^2}{\sum_{t=0}^{T} (h_{k-1}(t))^2}$$

or $$|local\_max\overline{i\overline{o}}num - local\_min\overline{i\overline{o}}mum| \leq 1$$

If the difference line h(t) cannot meet the condition of intrinsic mode function described above, the difference line h(t) is replaced with the signal S(t) to be diagnosed, and it is returned to execute the first step. After iterations of k times, if the difference line $h_k(t) = h_{k-1}(t) - m_k(t)$ meets the condition of intrinsic mode function as described above, the first intrinsic mode function will be extracted, i.e., $c_1(t) = h_k(t)$. An intrinsic mode function must meet the following two conditions: (1) the number of local extremum points and zero-crossing points must be equal or differ by at most one over the entire time range of the 1 function; and (2) at any point of time, the average of the envelope of the local maximum (upper envelope) and the envelope of the local minimum (lower envelope) must be zero.

The fourth step is to subtract the first intrinsic mode function $c_1(t)$ obtained in the third step from the input signal S(t) to preserve the residual signal $R_1(t)$, i.e., $R_1(t) = S(t) - c_1(t)$. That is, in the fourth step, the first intrinsic mode function $c_1(t)$ obtained in the third step is subtracted from the signal S(t) to be diagnosed to preserve the residual signal $R_1(t)$.

The fifth step is to judge whether the residual signal $R_1(t)$ is a monotonic function, if the residual signal $R_1(t)$ is not a monotonic function, the residual signal $R_1(t)$ is taken as the input signal S(t), and the first step to the fourth step are executed again; if the residual signal $R_1(t)$ is a monotonic function, the sixth step is executed.

The sixth step is to obtain n intrinsic mode functions $c_1(t)$ to $c_n(t)$ after executing n acquisitions, so the input signal S(t) can be expressed as:

$$S(t) = \left[\sum_{i=1}^{n} c_i(t)\right] + R_n(t)$$

The last remaining signal will be regarded as a residual signal.

Figure 2:
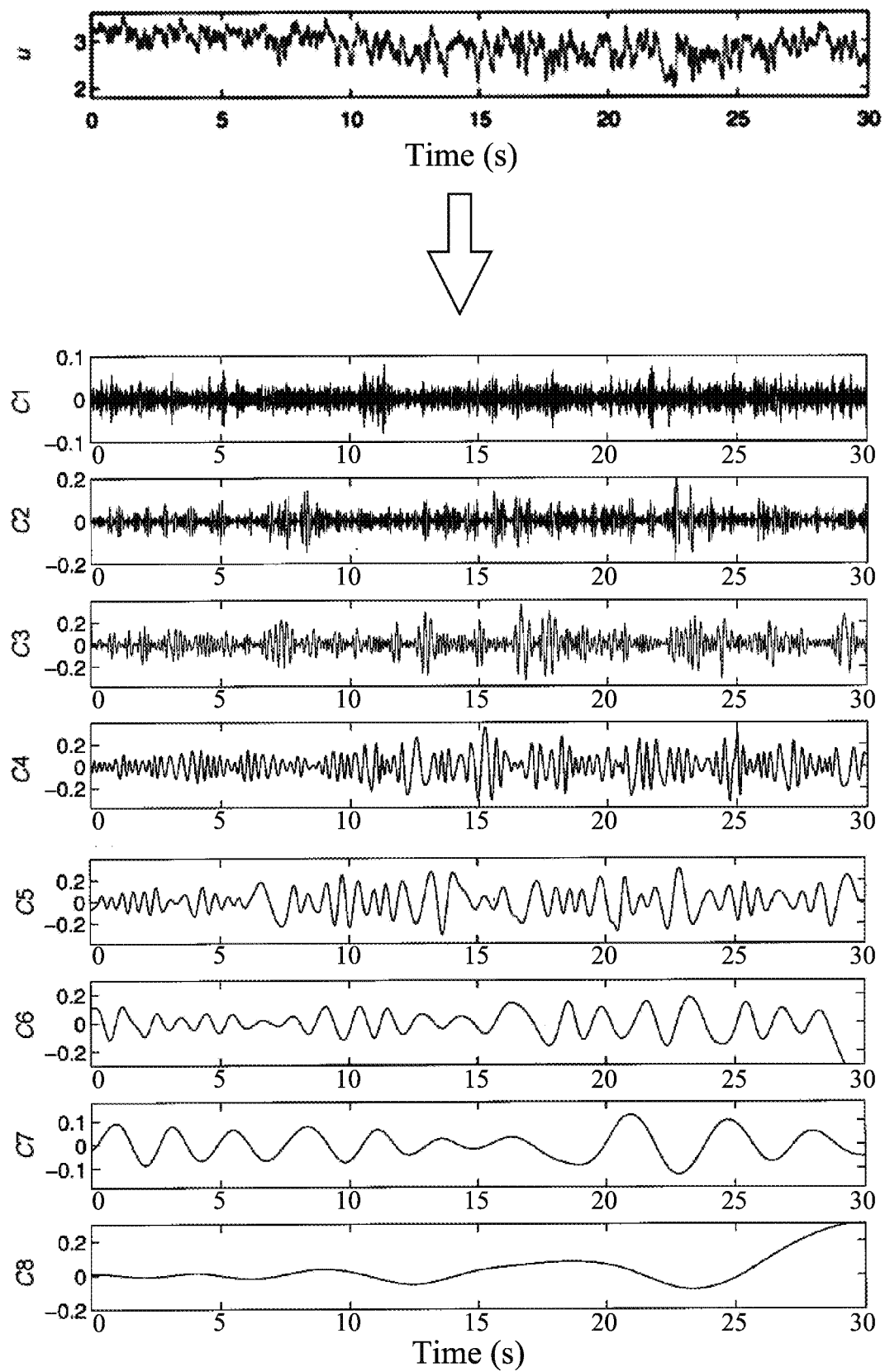
FIG. 2 is a schematic view illustrating an example of decomposing the signal to be diagnosed into a plurality of sub-signals.

Referring to FIG. 2, FIG. 2 is sourced by Norden E. Huang, et al. "The empirical mode decomposition and the Hilbert spectrum for nonlinear and non-stationary time series analysis." Proc. R. Soc. Lond. A (1998) 454, 903-995, FIG. 2 is a schematic view illustrating an example of decomposing the signal to be diagnosed into a plurality of sub-signals, which is specifically the decomposition result of an example after executing step S120 through the empirical mode decomposition model described above. That is, the signal to be diagnosed can obtain a plurality of sub-signals C1 to C8 after executing step S120 as described above through the empirical mode decomposition model, wherein the plurality of sub-signals C1 to C8 can also be called the intrinsic mode functions $c_1(t)$ to $c_8(t)$.

By using the empirical mode decomposition model to execute step S120, the complex signal can be decomposed into a limited number of intrinsic mode functions, and the decomposed components of each intrinsic mode function include local characteristic signals of different time scales of the signal to be diagnosed. Therefore, the empirical mode decomposition model can decompose various types of complex signals, which is helpful for more effective signal processing and analysis of the decomposed signal (i.e., intrinsic mode function), such as further transforming the mode function into a Hilbert spectrum.

In step S130, each of the plurality of sub-signals is transformed into a corresponding grayscale image.

Figure 3:
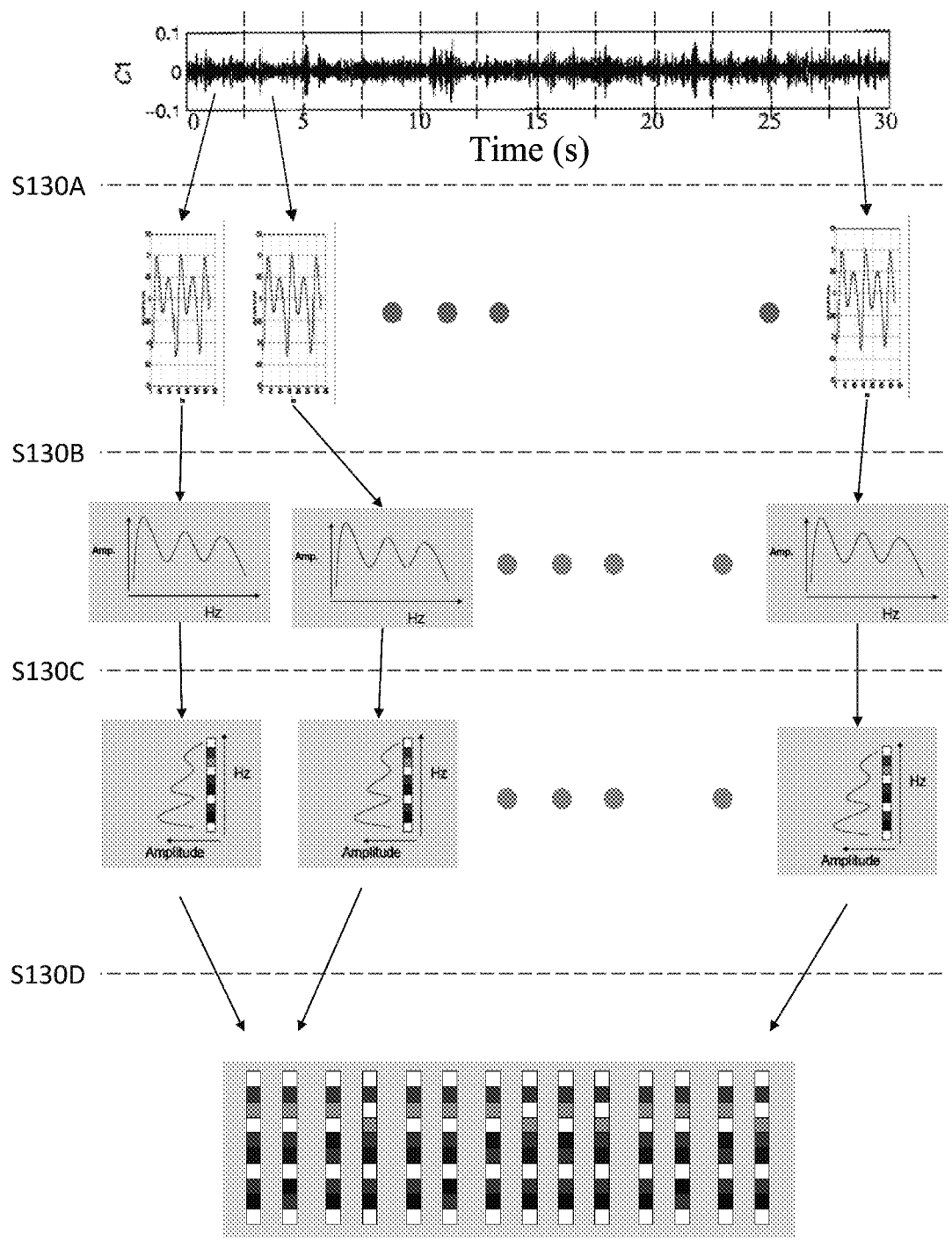
FIG. 3 is a detailed flowchart illustrating an example of each of the plurality of sub-signals transforming into a corresponding grayscale image.

Referring to FIG. 3, FIG. 3 is sourced from https://www.cs.brandeis.edu/~cs136a/CS136a_docs/KishorePrahallad_CMU_mfcc.p df (slides of Kishore Prahallad), and FIG. 3 is a detailed flowchart illustrating an example of each of the plurality of sub-signals transforming into a corresponding grayscale image. In some embodiments, the transformation process regarding the sub-signal transforming into the corresponding grayscale image may include the following steps:

The first step S130A is to divide the sub-signal into a plurality of signal segments, for example, the first intrinsic mode function $c_1(t)$ is divided into a plurality of first signal segments. At this time, the plurality of signal segments are still represented in the time domain.

The second step S130B is to transform the plurality of signal segments from the time domain signal to the frequency domain signal, for example, each of the plurality of first signal segments of the first intrinsic mode function $c_1(t)$ is transformed from the time domain signal to the frequency domain signal. In some embodiments, the transformation may be performed by a Fourier transformation model such as Fast Fourier Transform (FFT).

The third step S130C is to map the signal segment in the form of the plurality of frequency domain signals to a corresponding grayscale value based on the signal strength (i.e., amplitude value) of the signal segment. In some embodiments, the grayscale value may be between 0 and 255, wherein when the grayscale value is 0, it can represent black, and when the grayscale value is 255, it can represent white, but not limited thereto. In one example, a range of signal intensity can be set (e.g., 15 volts to −15 volts, but not limited thereto), and each signal segment can be normalized based on the range of signal intensity to map to the corresponding grayscale value.

The fourth step S130D is to integrate each grayscale value (that is, the grayscale value corresponding to each signal) into a two-dimensional grayscale matrix, and then transform into a corresponding grayscale image based on the two-dimensional grayscale matrix.

Figure 4:
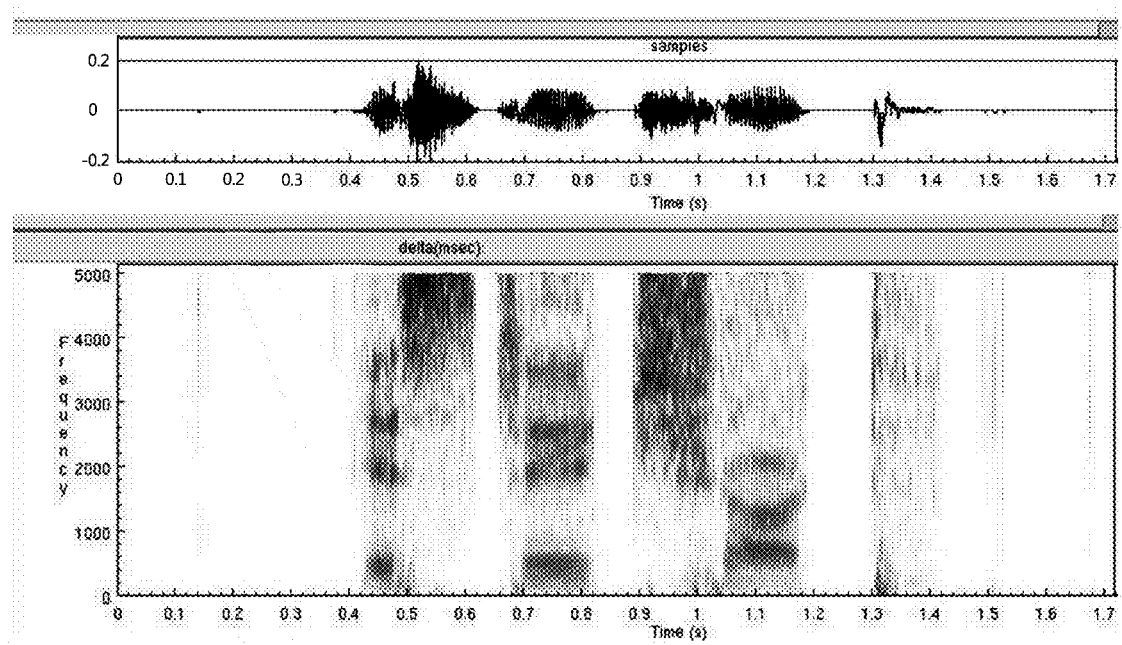
FIG. 4 is a schematic view illustrating the transformation result of an example of each of a plurality of sub-signals transforming into a corresponding grayscale image.

Referring to FIG. 4, FIG. 4 is a schematic view illustrating the transformation result of an example of each of a plurality of sub-signals transforming into a corresponding grayscale image. Through step S130, each of the plurality of sub-signals can be mapped to the corresponding grayscale value to obtain a two-dimensional grayscale matrix, and then produce the corresponding grayscale image. In some embodiments, the grayscale image may be a two-dimensional grayscale diagram that can represent each grayscale value, but is not limited thereto.

In step S140, the corresponding grayscale image is input to a neural network model, and the malfunction reason classification result is output through the neural network model. The neural network model may refer to a neural network model that has been trained by plural pieces of data, wherein each of plural pieces of data may include a machine system signal and a machine system state corresponding to the machine system signal, and the structure of the neural network model may be a structure known to a person having ordinary knowledge in the art. In some embodiments, the neural network model may be a convolutional neural network model or a recurrent neural network model, but not limited thereto. Among them, the convolutional neural network model, for example, may be PyTorch RESNET, but not limited thereto.

By the method for diagnosing the reason of the malfunction as shown in FIG. 1, an apparatus to be diagnosed can be diagnosed to produce a malfunction reason classification result, and then know the type of malfunction that the apparatus to be diagnosed may be about to occur. In some embodiments, the malfunction reason classification result may include at least one of an unbalanced state, a non-parallel state, a shaft that is skew, and a loose state, but not limited thereto.

Figure 5:
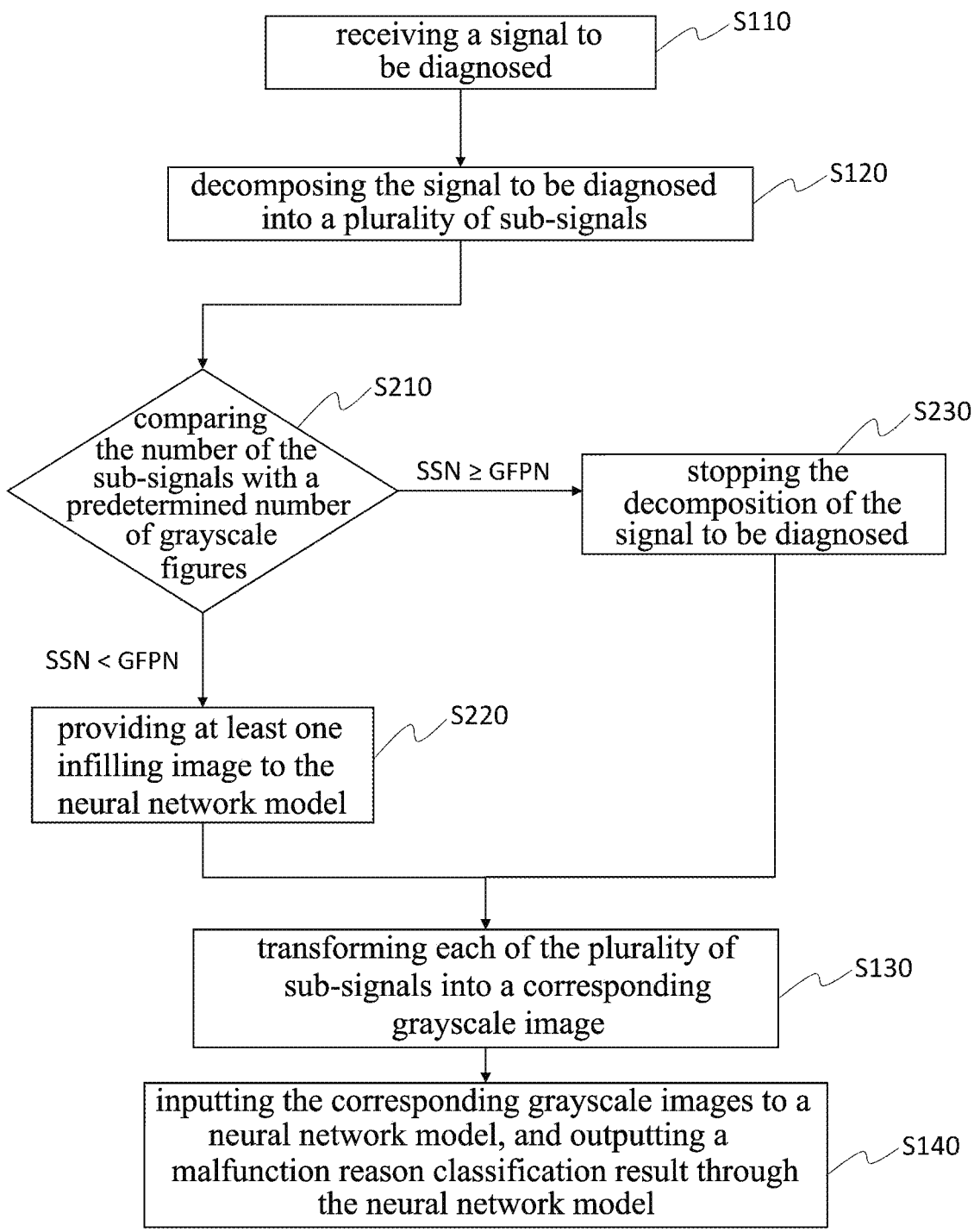
FIG. 5 is a flowchart illustrating a method for diagnosing the reason of the malfunction according to another embodiment of the present disclosure.

Referring to FIG. 5, FIG. 5 is a flowchart illustrating a method for diagnosing the reason of the malfunction according to another embodiment of the present disclosure, the method includes steps S110, S120, S130, S140, S210, S220 and S230, wherein steps S110, S120, S130 and S140 are substantially the same as the steps shown in FIG. 1. That is, the method shown in FIG. 5 may include steps S110, S120, S130 and S140 substantially the same as FIG. 1, and further include steps S210, S220 and S230.

In step S210, the number of sub-signals SSN is compared with a predetermined number of grayscale figures GFPN, when the number of sub-signal SSN is less than the predetermined number of grayscale figures GFPN, at least one infilling image is provided to the neural network model (i.e., step S220), and step S130 is executed successively; when the number of sub-signals SSN is greater than or equal to the predetermined number of grayscale figures GFPN, the decomposition of the signal to be diagnosed (i.e., step S230) is stopped, and step S130 is executed successively. In some embodiments, the predetermined number of grayscale figures GFPN may be preset to 8, but not limited thereto.

In some embodiments, the number of infilling images regarding step S220 may depend on the number of sub-signals SSN and the predetermined number of grayscale figures GFPN, for example, the number of infilling images may be the difference between the predetermined number of grayscale figures GFPN and the number of sub-signals SSN. For example, when the predetermined number of grayscale figures GFPN is preset to 8, if the number of sub-signals SSN is 5, the number of infilling images is 3.

Since the number of sub-signals decomposed by step S120 depends on the signal to be diagnosed, by the method of diagnosing the reason of the malfunction as shown in FIG. 5, a fixed number of images (the total number of grayscale images and infilling images is equal to the predetermined number of grayscale figures) may be input to the neural network model, so that the neural network model can predict the malfunction reason classification results of the apparatus to be diagnosed based on the same number of images.

Example 1

Pre-Training of a Neural Network Model

1. PyTorch RESNET (https://pytorch.org/hub/pytorch_vision_resnet/) is used to build an image classifier.

2. It is assumed that the result of EMD is selected less than or equal to 10 (that is, the number of a plurality of sub-signals decomposed by the empirical mode decomposition model is set to less than or equal to 10), the IMF is split into spectrograms in units of every 100 milliseconds (that is, the first step S130A decomposes each intrinsic mode signal into a plurality of signal segments in units of every 100 milliseconds) and an amplitude value is between −15 and 15 (that is, the third step S130C respectively normalizes the plurality of signal segments based on the amplitude value to map to a corresponding grayscale value).

3. Therefore, the shape and size of the image may be the number of EMDs×amplitude value×the number of the plurality of signal segments, if the total reception time of the signal to be diagnosed is 100 seconds, then the calculation formula 1000000/100=1000 is used (that is, the shape and size of the image is 10×30×1000), and the image size is adjusted from 1000 to the default value (i.e., 224), that is, 10×30×224.

Through the above-mentioned neural network model, combined with plural pieces of data for pre-training, a trained network model can be generated (e.g., a neural network model with a recognition accuracy higher than 0.995, but not limited thereto). Accordingly, the trained neural network model can be used to diagnose the apparatus to be diagnosed, so as to produce a malfunction reason classification result, and then know the type of malfunction that the apparatus to be diagnosed may be about to occur.

Figure 6:
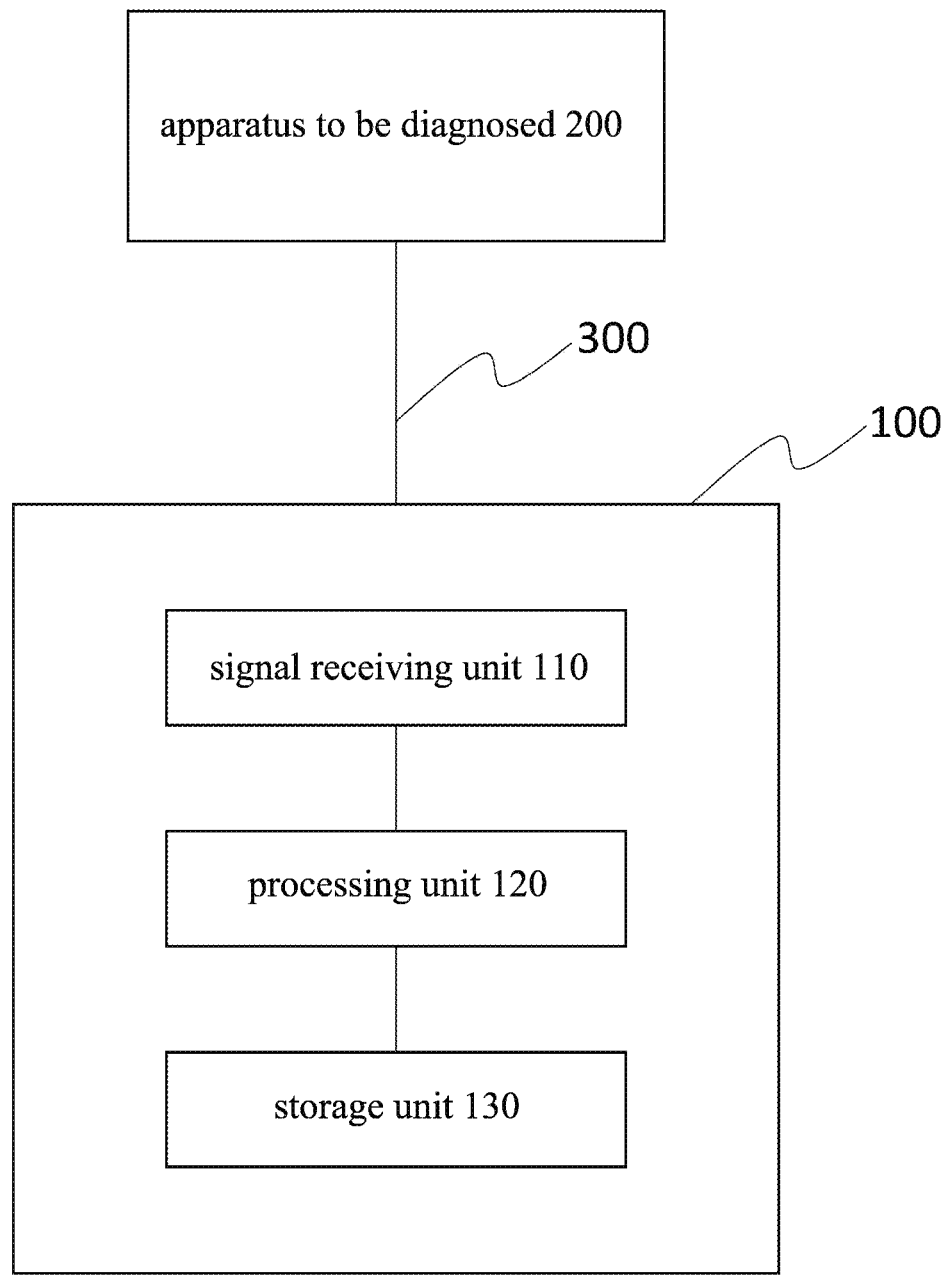
FIG. 6 is a schematic block diagram illustrating a device for diagnosing a reason of a malfunction connected with an apparatus to be diagnosed by signal of an embodiment of the present disclosure.

Referring to FIG. 6, FIG. 6 is a schematic block diagram illustrating a device 100 for diagnosing a reason of a malfunction connected with an apparatus 200 to be diagnosed by signal of an embodiment of the present disclosure. The device 100 for diagnosing the reason of the malfunction may include a signal receiving unit 110, a processing unit 120 and a storage unit 130.

The device 100 for diagnosing the reason of the malfunction may be connected with the apparatus 200 to be diagnosed by signal, which may be specifically connected by signal through a signal line such as RS-232 or RS-485. Thus, the signal receiving unit 110 in the device 100 for diagnosing the reason of the malfunction may receive a signal to be diagnosed from the apparatus 200 to be diagnosed via the signal line 300.

The processing unit 120 may be a finished product known to a person having ordinary knowledge in the art, which may be specifically composed of one or more central processing units, but not limited thereto. The processing unit 120 is configured to couple with the signal receiving unit 110 for processing the signal to be diagnosed received by the signal receiving unit 110, the processing may refer to each step of executing the method of diagnosing the reason of the malfunction as described above. That is, after executing a specific code or instruction set, the processing unit 120 can complete the method of diagnosing the reason of the malfunction as described above based on the signal to be diagnosed received by the signal receiving unit 110.

The storage unit 130 may be a finished product known to a person having ordinary knowledge in the art, which may be specifically composed of volatile memory and non-volatile memory, but not limited thereto, wherein volatile memory is a finished product known to a person having ordinary knowledge in the art, such as dynamic random access memory or static random access memory, but not limited thereto; non-volatile memory may be a finished product known to persons having ordinary knowledge in the art, such as read-only memory, flash memory or non-volatile random access memory, but not limited thereto. The memory unit 130 stores a code or instruction set, and is configured to couple with the processing unit 120, so that the processing unit 120 can execute the code or instruction set stored in the memory unit 130, so as to complete the method of diagnosing the reason of the malfunction as described above based on the signal to be diagnosed received by the signal receiving unit 110.

The device 100 for diagnosing the reason of the malfunction as shown in FIG. 6 can connect with the apparatus 200 to be diagnosed by signal, and diagnose the apparatus to be diagnosed based on the signal to be diagnosed from the apparatus to be diagnosed, so as to produce a malfunction reason classification result, and then know the type of malfunction that the apparatus to be diagnosed may be about to occur.

Further, in some embodiments, the steps of the method for diagnosing the reason of the malfunction as described above may be stored in a computer-readable recording medium, the computer-readable recording medium, for example, may be a hard disk, a CD-ROM, a disk, a USB flash drive, or a database accessible by the cloud, but not limited thereto. The computer-readable recording medium can complete the method for diagnosing the reason of the malfunction as described above after the computer, computer device or other device capable of executing a code loads and executes the code or instruction set stored in the computer-readable recording medium.

Since the computer-readable recording medium stores a code or instruction set capable of completing the method for diagnosing the reason of the malfunction as described above, after the computer, computer device or other device capable of executing the code or instruction set loads and executes the code or instruction set, the computer-readable recording medium can diagnose the apparatus to be diagnosed, so as to produce a malfunction reason classification result, and then know the type of malfunction that the apparatus to be diagnosed may be about to occur.

While the present invention has been described by means of preferable embodiments, those skilled in the art should understand the above description is merely embodiments of the invention, and it should not be considered to limit the scope of the invention. It should be noted that all changes and substitutions which come within the meaning and range of equivalency of the embodiments are intended to be embraced in the scope of the invention. Therefore, the scope of the invention is defined by the claims.

What is claimed is:

1. A method for diagnosing a reason of a malfunction, comprising:
    receiving a signal to be diagnosed;
    decomposing the signal to be diagnosed into a plurality of sub-signals;
    transforming each of the plurality of sub-signals into a corresponding grayscale image; and
    inputting the corresponding grayscale images to a neural network model, and outputting a malfunction reason classification result through the neural network model.

2. The method according to claim 1, wherein decomposing the signal to be diagnosed into a plurality of sub-signals is completed by an empirical mode decomposition model.

3. The method according to claim 1, wherein the sub-signals are intrinsic mode functions.

4. The method according to claim 1, wherein transforming each of the plurality of sub-signals into the corresponding grayscale image comprises:
    performing signal transformation of the sub-signals by a Fourier transformation model;
    respectively mapping signal strength of the sub-signals after the signal transformation to a corresponding grayscale value; and
    integrating the corresponding grayscale values into the corresponding grayscale image.

5. The method according to claim 1, further comprising:
    comparing the number of the sub-signals with a predetermined number of grayscale figures that the neural network model can receive;

when the number of the sub-signals is greater than or equal to the predetermined number of grayscale figures, the decomposition of the signal to be diagnosed is stopped; and when the number of the sub-signals is less than the predetermined number of grayscale figures, at least one infilling image is provided to the neural network model.

6. The method according to claim 5, wherein the number of the at least one infilling image depends on the number of the sub-signals and the predetermined number of grayscale figures.

7. The method according to claim 1, wherein the neural network model is a convolutional neural network model trained by plural pieces of data, and each piece of the data comprises a machine system signal and a machine system state corresponding to the machine system signal.

8. The method according to claim 1, wherein the malfunction reason classification result comprises at least one of an unbalanced state, a non-parallel state, a shaft that is skew, and a loose state.

9. A device for diagnosing a reason of a malfunction, suitable for connecting with an apparatus to be diagnosed by signal, in order to receive a signal to be diagnosed from the apparatus to be diagnosed, the device comprising:
a signal receiving unit, suitable for receiving the signal to be diagnosed;
a processing unit, configured to couple with the signal receiving unit; and
a storage unit, configured to couple with the processing unit,
wherein the storage unit stores a code, and after the processing unit executes the code stored in the storage unit, the device can execute steps as described below:
receiving a signal to be diagnosed;
decomposing the signal to be diagnosed into a plurality of sub-signals;
transforming each of the plurality of sub-signals into a corresponding grayscale image; and
inputting the corresponding grayscale images to a neural network model, and outputting a malfunction reason classification result through the neural network model.

10. The device according to claim 9, wherein decomposing the signal to be diagnosed into a plurality of sub-signals is completed by an empirical mode decomposition model.

11. The device according to claim 9, wherein the sub-signals are intrinsic mode functions.

12. The device according to claim 9, wherein transforming each of the plurality of sub-signals into the corresponding grayscale image comprises:
performing signal transformation of the sub-signals by a Fourier transformation model;
respectively mapping signal strength of the sub-signals after the signal transformation to a corresponding grayscale value; and
integrating the corresponding grayscale values into the corresponding grayscale image.

13. The device according to claim 9, wherein after the processing unit executes the code stored in the storage unit, the device can execute steps as described below further comprising:
comparing the number of the sub-signals with a predetermined number of grayscale figures that the neural network model can receive;
when the number of the sub-signals is greater than or equal to the predetermined number of grayscale figures, the decomposition of the signal to be diagnosed is stopped; and
when the number of the sub-signals is less than the predetermined number of grayscale figures, at least one infilling image is provided to the neural network model.

14. The device according to claim 13, wherein the number of the at least one infilling image depends on the number of the sub-signals and the predetermined number of grayscale figures.

15. A non-transitory computer-readable recording medium capable of diagnosing a reason of a malfunction, after a computer loads and executes a code stored in the non-transitory computer-readable recording medium, the non-transitory computer-readable recording medium can complete steps as described below:
receiving a signal to be diagnosed;
decomposing the signal to be diagnosed into a plurality of sub-signals;
transforming each of the plurality of sub-signals into a corresponding grayscale image; and
inputting the corresponding grayscale images to a neural network model, and outputting a malfunction reason classification result through the neural network model.

16. The non-transitory computer-readable recording medium according to claim 15, wherein decomposing the signal to be diagnosed into a plurality of sub-signals is completed by an empirical mode decomposition model.

17. The non-transitory computer-readable recording medium according to claim 15, wherein the sub-signals are intrinsic mode functions.

18. The non-transitory computer-readable recording medium according to claim 15, wherein transforming each of the plurality of sub-signals into the corresponding grayscale image comprises:
performing signal transformation of the sub-signals by a Fourier transformation model;
respectively mapping signal strength of the sub-signals after the signal transformation to a corresponding grayscale value; and
integrating the corresponding grayscale values into the corresponding grayscale image.

19. The non-transitory computer-readable recording medium according to claim 15, wherein after the computer executes the code stored in the non-transitory computer-readable recording medium, the non-transitory computer-readable recording medium can complete steps as described below further comprising:
comparing the number of the sub-signals with a predetermined number of grayscale figures that the neural network model can receive;
when the number of the sub-signals is greater than or equal to the predetermined number of grayscale figures, the decomposition of the signal to be diagnosed is stopped; and
when the number of the sub-signals is less than the predetermined number of grayscale figures, at least one infilling image is provided to the neural network model.

20. The non-transitory computer-readable recording medium according to claim 19, wherein the number of the at least one infilling image depends on the number of the sub-signals and the predetermined number of grayscale figures.

* * * * *